A. H. FOWLER.

Improvement in Fishing-Reels.

No. 128,137. Patented June 18, 1872.

Witnesses:
H. P. Sanders
A. C. Wiley

Alonzo H. Fowler Inventor:
By S. Wakeman Atty

UNITED STATES PATENT OFFICE.

ALONZO H. FOWLER, OF BATAVIA, NEW YORK.

IMPROVEMENT IN FISHING-REELS.

Specification forming part of Letters Patent No. 128,137, dated June 18, 1872.

Specification describing a certain Improvement in Fishing-Reels, invented by ALONZO H. FOWLER, of Batavia, in the county of Genesee and State of New York.

My invention consists of a fishing-reel made of hard rubber or vulcanite, substantially as hereinafter specified.

Figure 1:
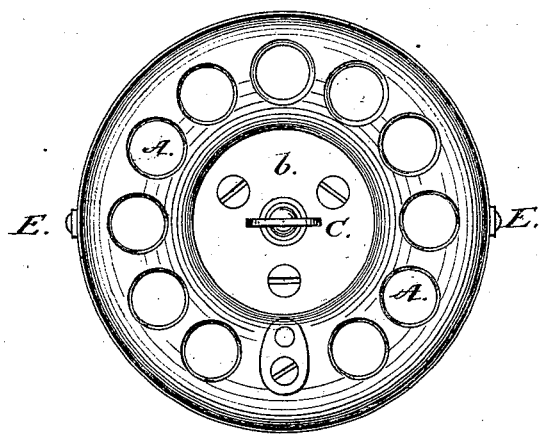
Figure 2:
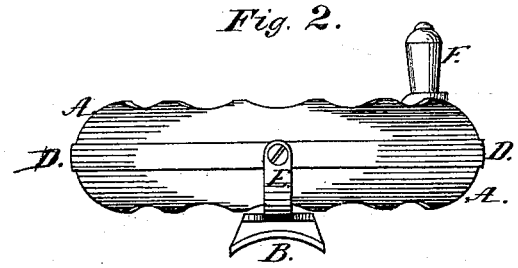
Figure 3:
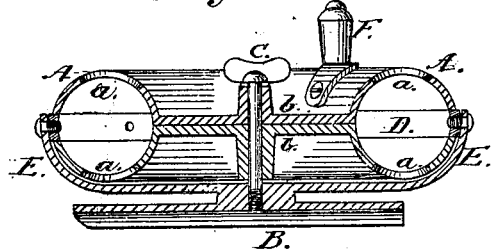

In the annexed drawing, Figure 1 is a plan view of my improved reel. Fig. 2 is an end view, and Fig. 3 is a longitudinal section thereof.

This reel is made entirely of hard rubber or vulcanite. The process for manufacturing articles from this material, being well understood, does not need particular description.

Referring to the drawing, A designates the skeleton spool or reel proper; B, the scale-plate by which the whole device is attached to the rod; C, the axis-pin; D, the rim; and E, the arms, which support the rim. The spool is made of two circular disks, each having an annular semicircular depression, $a$, around its outer edge, and a circular flat portion, $b$. The annular depressed portions are perforated, as seen in the drawing, to allow a free circulation of air in order to dry the line. The flat parts $b\ b$ are joined together by screws or an equivalent fastening. The outer edges of the disks do not meet, but leave a space which is filled by the rim D. The rim has a small hole through which the line is reeled, and it is supported in place by the arms E, which are firmly attached to the scale-plate. F is the handle, by which the spool is revolved on the axis-pin. The axis-pin has a screw-threaded end which is tapped into the scale-plate, and it is adapted to be easily turned by the thumb and finger. By turning up the pin the edge of the spool is made to press against the rim, thus acting as a brake to check or stop the spool, as may be desired. The reel is simple in construction, light and durable, and finished in appearance. The hard rubber is non-corrosive and peculiarly adapted for this purpose.

Having described my invention, what I claim, and desire to secure by Letters Patent, is—

The fishing-reel composed of the parts A, B, D, and E, of hard rubber, and the axis-pin C, all substantially as herein described.

ALONZO H. FOWLER.

Witnesses:
BENJAMIN C. PAGE,
WEEDEN T. BLISS.